2,992,901
PRODUCTION OF ARTIFICIAL GRAPHITE
Richard S. Fisher, Fostoria, Ohio, Joseph W. Gartland, deceased, late of Lakewood, Ohio, by Elizabeth M. Gartland, executrix, Lakewood, and Isaac P. Mail, Fostoria, Ohio, and Harry C. Stieber, Lewiston, N.Y., assignors to Union Carbide Corporation, a corporation of New York
No Drawing. Filed Apr. 29, 1958, Ser. No. 731,604
16 Claims. (Cl. 23—209.3)

This invention relates to a process for producing artificial graphite and articles thereof having improved thermal and electrical qualities.

It is the principal object of the invention to provide a process for the production of artificial graphite without regard to the type of coke from which the article being graphitized has been formed. More specifically, it is an object of the invention to provide artificial graphite and articles composed thereof having improved thermal and electrical properties.

There has occurred in the past few years a growing demand by industry for a high grade of graphitized carbon. A particular source of such demand is the steel industry where the great advantages of the electric arc smelting furnace have led to its increased use. The severe operating conditions of high temperatures and thermal shock usually encountered in electric arc furnaces require that the electrodes used have good mechanical and thermal properties as well as excellent electrical properties.

Generally, the attainable quality of any artificial graphite is governed and limited by the type of coke used in the basic mixture from which the electrode is produced. When a low grade of coke is employed, a correspondingly inferior grade of graphite will be obtained. In like manner, to make a more desirable graphite article, it is necessary to employ a higher grade of coke in the mix.

Unfortunately, what constitutes a satisfactory type of coke has always been problematical and uncertain of evaluation. As a matter of fact, a conventional way of determining the worth of a coke is to make and test sample electrodes from it. One of the yardsticks by which the quality of a raw coke is determined lies in the coefficient of thermal expansion attainable in a sample graphite article made from it. This property is of particular importance in the instance of such graphitized articles as electric furnace electrodes wherein high operating temperatures and severe loading conditions make it imperative that the electrode be durable.

In choosing a proper coke for the basic material, it is generally assumed that an acceptable grade furnace electrode made therefrom will have a maximum coefficient of thermal expansion within the range of $10 \times 10^{-7}$ to $15 \times 10^{-7}$ inches per inch per degree centigrade. When a value of from $25 \times 10^{-7}$ to $30 \times 10^{-7}$ is approached, the coke is considered unsatisfactory for use in the manufacture of electrodes, for electrodes of such a high coefficient of thermal expansion are susceptible to cracking by thermal shock.

The art of graphitizing carbon is not one of recent origin, nor is it by any means novel, but on the other hand, it is a process to which a great deal of importance attaches by virtue of the many improvements inherent in graphitized articles, as contrasted with similar ungraphitized carbonaceous forms. Varied and well-founded theories exist as to the physical and chemical phenomena by which an amorphous carbon mass is converted to a crystalline, graphitic structure when said carbon is subjected to certain conditions. One hypothesis that has been experimentally substantiated to some degree is that the presence of particular impurities within the carbonaceous mix will tend to foster the required conversion. Such impurities, while not catalyzing the reaction, seem to form nuclei about which the subsequent graphitization takes place and assure a more complete conversion to the graphitic state.

One of the theories advanced in the past is that the impurities present in the mix tend to form carbides during the graphitizing process, which carbides decompose into graphite and metal vapor. Upon liberation, the metal vapor reforms carbide, the process continuing until the carbon present has been substantially graphitized.

Among those who propounded this theory was Acheson, the originator of artificial graphite. He has indicated in various United States patents that the presence of certain added impurities within the mix, whether they be present purposely or unintentionally, will promote a complete conversion of carbon from the amorphous state to the graphitic state. Among the substances stated to accomplish such a result are included the oxides of iron, aluminum and silicon and also certain salts.

While the teachings of Acheson have been found correct to a certain degree, closer examination and tests of graphite prepared by his method have shown that complete graphitization is usually not attained. For this reason, among others, articles graphitized in accordance with commercial practice are still dependent to a great extent on the characteristics of the coke in the carbon mix and the mineral impurities normally present therein in the graphitizing process.

The normal commercial procedure for graphitizing carbon articles is to envelop the inner graphitizing zone in the furnace throughout the heating and cooling cycle, with a silicon carbide-producing mixture of coke and sand. When a temperature of as low as about 1500° C. is reached in the furnace, reaction begins between the sand and coke to produce silicon carbide. At still higher temperatures, an atmosphere of silicon carbide vapor is provided. This suggests that the conversion from carbon to graphite is enhanced by the presence of such an atmosphere.

In studying this phase of the graphitizing process, it has been discovered that although the silicon carbide is essential to the process, the graphitizing effect is greatly amplified when an additional carbide having a higher volatilization temperature than silicon carbide is present. Carbides which have been found useful are titanium carbide, boron carbide, molybdenum carbide, niobium carbide, vanadium carbide and zirconium carbide. The presence of at least one of these carbides in addition to silicon carbide at the graphitizing temperature has been found to produce a synergistic result not producible by the presence of any single carbide.

In accordance with these discoveries, the invention comprises a method of producing formed, artificial graphite articles in which a formed, baked carbon article is graphitized in the presence of silicon carbide and at least one carbide selected from the group consisting of titanium carbide, boron carbide, molybdenum carbide, niobium carbide, vanadium carbide or zirconium carbide. The silicon carbide may be incorporated in the mix, which otherwise is conventional, consisting of comminuted carbon and carbonizable binder, or may be produced in the graphitizing zone in the furnace during graphitization as above explained. The carbide selected from the group above enumerated may be incorporated in the mix by adding it as the carbide, or a carbide-forming element or compound thereof may be added to the mix prior to forming it and baking the formed article. In the latter case, the carbide is formed by reaction with the carbon of the article during heating of the article prior to completion of its graphitization. Whether or not the carbides present during graphitizing of the formed, baked article are incorporated in the mix prior to shaping it, forming, baking and graphitizing of the formed article are performed in conventional manner. Preferably the graphitized article is purged of residual carbide by subjecting it to the action of a halogen or other purifying atmosphere at an elevated temperature.

In the method of the invention at least about 5% by weight of carbide selected from the group: titanium carbide, boron carbide, molybdenum carbide, niobium carbide, vanadium carbide and zirconium carbide should be present in the carbon article to be graphitized. Silicon carbide should be present in an amount not less than 4% by weight of the article, the ratio of silicon carbide to the more refractory carbide being not less than 0.8 to 1. As explained above, the addition of silicon carbide to the articles may be accomplished by direct admixture or by absorption from a silicon carbide vapor present due to the coke-sand mixture which surrounds the article during graphitization in the furnace. Generally, the maximum total content of carbides should not exceed 20% by weight of the article. This maximum is determined in part by the fact that residual carbides preferably should be removed from the graphitized article as will be explained in detail below.

As has been indicated, while the more refractory carbide or carbide-forming compound is added to the mix from which the carbon article to be graphitized is formed, silicon carbide may be added to the mix or derived from the atmosphere in which graphitization takes place. Which of these two procedures is followed is determined, at least in part, by the size of the article to be graphitized. If the article is not more than about two or three inches in diameter or thickness, the latter procedure is entirely satisfactory, but if the article is greater in diameter or thickness than about three inches, more uniform results will be obtained if the silicon carbide is added to the mix in the proportions indicated. If the silicon carbide is to be derived from the atmosphere, the required amount is obtained from a coke-sand mixture in which the articles to be graphitized are packed, the mixture containing about 10% to 20% sand.

Articles which have been graphitized in accordance with the practice of the invention show an immediate improvement in conductivity when compared with similar articles made in substantially the same manner but without the presence of carbide other than silicon carbide. However, for optimum reduction in coefficient of thermal expansion, experience has shown that removal of residual carbide from, or "purification" of, the graphitized article is required. This may be accomplished by treatment of the article with a halogen at elevated temperature, e.g. at least about 2000° C. to 2500° C., in a manner well known in the art. For example, residual carbide may be removed by heating the article in a chlorine atmosphere at temperatures of the order of about 2800° C. It is specifically pointed out that the invention is not limited to any particular process for removing residual carbides from the treated articles.

With regard to the mechanism of graphitization in the method of the invention, it is believed that the more refractory metal carbide and the silicon carbide co-act during the graphitization to form a eutectic melt and that graphite crystals are formed from a solution of carbon in the melt. Whether or not this belief is correct, it is the fact that when graphitization is conducted in the manner of the invention, the unexpected effect is attained of a greater degree of carbon-to-graphite conversion than has ordinarily been attained in conventional graphitizing operations.

A number of tests of the method of the invention have been made to investigate its efficacy, and an understanding of its principles may be aided by consideration of each test. For example, in one series of tests a carbonaceous blend was prepared comprising comminuted petroleum coke flour and titanium carbide. To this dry blend was added warm pitch, the resulting composition being further mixed at a temperature of about 150° C., giving a plastic, paste-like agglomerate. The mix so produced was extruded into 5/8 inch diameter rods, which were cut to length and baked to carbonize the binder. The rods were then packed in a coke-sand mixture containing 10% sand in an electrically heated tube furnace. They were graphitized in this furnace by baking at a measured temperature of 2600° C. After cooling, the rods were removed from the furnace and tested to obtain values of coefficient of thermal expansion and electrical resistivity. The rods were then purified, being heated to a temperature of about 2800° C. in the presence of chlorine gas to remove residual carbides and other impurities therefrom. After such purification, they were again removed and tested for the same values as above noted.

This form of testing was carried out on several mixes wherein different amounts of titanium carbide were admixed with the comminuted carbon and pitch binder. In Table I results of tests made on rods made of two different mixes in the manner just described are set forth. Mix 1 contained no titanium carbide, but mix 2 contained 10% titanium carbide. Rods made from both mixes were tested in the graphitized condition and in the purified condition after graphitization. The data reported in the table are specific resistance ("Sp. Res."), apparent density ("A.D.") and coefficient of thermal expansion ("C.T.E.").

Table I

| Mix No. | Percent TiC Added to Mix | Sp. Res. (Ohm-cm.) ×10⁶ | A.D. | C.T.E.[1] (In./In./°C.) ×10⁷ | Condition of Sample |
| --- | --- | --- | --- | --- | --- |
| 1 | 0 | 1,313 | 1.362 | 14.3 | Graphitized. |
| 1 | 0 | 1,294 | 1.361 | 14.9 | Purified. |
| 2 | 10 | 566 | 1.626 | 12.5 | Graphitized. |
| 2 | 10 | 566 | 1.418 | 4.6 | Purified. |

[1] Expansion in direction of length of the rod.

From the values shown above, it will be seen that the graphitized rod made from carbon mix containing titanium carbide displays a much lower specific electrical resistance than the graphitized rod made from mix containing no added refractory carbide. Further, it will be noted that this large improvement in electrical conductivity is present before the rod is purified, but that the most significant improvement in coefficient of thermal expansion was realized in the purified rod. It should also be observed that the apparent density of rods made from the titanium carbide-containing mix was substantially higher in the graphitized condition than that of rods made from the other mix, but that after purification, the apparent density was only slightly above that of the rods made from mix 1, indicating the presence of residual carbides in the rods as graphitized, and their removal by purification. The .000566 ohm-cm. resistivity value displayed by the mix No. 2 rod is well within the range of resistivity obtained in measuring Ceylon type natural graphite; various workers having reported values of from .0012700 down to .0000190 ohm-cm. A typical value obtained for lump Ceylon graphite as measured by one of the inventors was .00074 ohm-cm.

The belief that the conversion of amorphous carbon to the highly crystalline form of graphite, as obtained by this invention, is dependent upon an interaction, within the formed article, between the more refractory carbide and silicon carbide vapor is supported by the observation that such articles when packed in a coke-sand mixture and heated to a temperature above about 2600° C. will show a gain in weight. In one experiment small, pitch-bonded lampblack base carbon blocks containing initially a 10% addition of boron carbide grain were found to have gained an additional 13% in weight of carbides when heated to 2900° C. in a coke-sand mixture. This effect of gaining weight seems to start at approximately 2600° C., and reaches a maximum at about 2900° C. Lampblack base carbon articles are completely converted to the unctuous, highly crystalline graphite state under these conditions.

In carrying out the process on rods of varying diameters it had been noted that, while the smaller sizes up to two inches in diameter were generally completely graphitized, larger ones did not produce the same result. Even though the samples were prepared by graphitizing in a silicon carbide atmosphere with an additional refractory metal carbide in its mix, examination after graphitization of articles having a diameter greater than about two inches indicated that while the outer layers of carbon were substantially converted to crystalline graphite, the inner or core section had not been so completely changed. Such inner sections indicated only partial graphitization, having thermal and electrical properties similar to those shown by mix No. 1 in Table I above.

In overcoming this deficiency it has been found that for the larger diameter articles complete graphitization may be more successfully accomplished if to the mix from which they are formed is added both a high temperature refractory metal carbide and also a predetermined amount of silicon carbide. For example, a number of electrodes of four inch diameter were made in this way with different quantities of silicon carbide and titanium carbide added to the mix. These electrodes were formed, baked and graphitized in the manner described above, and the coefficient of thermal expansion was measured after graphitization. The graphitized electrodes were then purified by heating in a chlorine atmosphere at a temperature of about 2800° C. and their coefficient of thermal expansion was again measured. Examination of the electrodes in cross section showed substantially uniform graphitization throughout. The values determined for coefficient of thermal expansion are set forth in Table II.

Table II

| Added to Mix | | Coefficient [1] of Thermal Expansion $\times 10^7$ inches per inch per degree C. in 4″ diameter electrodes | |
|---|---|---|---|
| Percent TiC | Percent SiC | After Graphitization at 2,500° C. | After Purification at 2,800° C. in a chlorine atmosphere |
| 0 | 0 | 14.5 | 12.9 |
| 4 | 1.6 | 17.5 | 14.1 |
| 4 | 3.2 | 17.3 | 13.3 |
| 4 | 4.8 | 16.5 | 12.1 |
| 7 | 2.8 | 17.3 | 11.7 |
| 7 | 5.6 | 14.5 | 7.6 |
| 7 | 8.4 | 13.3 | 7.2 |
| 10 | 4.0 | 16.1 | 8.9 |
| 10 | 8.0 | 12.5 | 4.4 |

[1] As measured in direction of the length of the electrode.

The graphitization process may be readily carried out satisfactorily by the disclosed method comprising the formation of a eutectic melt of silicon carbide and another metal carbide in the formed carbon article under varying conditions. In that the required silicon carbide atmosphere forms by reaction of the added metallic carbides, it is not always necessary to perform the process within a covering of sand and coke. For example, complete graphitization may take place in a non-oxidizing atmosphere as provided by an inert gas such as nitrogen, as long as there are present in the article the necessary constituents, the silicon carbide and another carbide selected from the aforementioned group.

In another example of the practice of the invention, varying amounts of boron carbide were added to a coke mix, said amounts varying from 0.5 to 10 parts of boron carbide to 100 parts of coke. The graphitization of the articles made therefrom in this instance was carried out at 3000° C. in a coke-sand pack and with a subsequent purification at 2800° C. in a chlorine atmosphere. The steadily decreasing values of specific resistance reported in Table III are indicative of relatively complete degree of graphitization reached.

Table III

| Parts $B_4C$ per 100 Coke: | Specific resistance Ohm-cm. $\times 10^6$ |
|---|---|
| 0.5 | 1270 |
| 2.5 | 711 |
| 5.0 | 508 |
| 10 | 430 |

While the examples shown have been of mixtures with a petroleum coke base, this does not limit the process to such material. The method has been found to work equally as well in promoting substantially complete conversion to the graphitic state from other types of carbon such as lampblack, metallurgical coke, sawdust, wood charcoal and coconut charcoal. After graphitization and purification, all were found to have produced a highly graphitic, unctuous material.

Of perhaps the greatest advantage in the practice of this invention in the manufacture of electric arc furnace electrodes, is the finding that desirably low coefficient of thermal expansion in the product can be produced from petroleum coke sources which prior to this invention were unusable in electrodes.

What is claimed is:

1. A method for producing a formed, artificial graphite article which comprises preparing a mix of comminuted carbon and carbonizable binder material; forming an article of desired shape from said mix; baking the article so formed to carbonize said binder material; and graphitizing the formed, baked article by heating to graphitizing temperature, said article containing during graphitization silicon carbide and at least one carbide selected from the group consisting of titanium carbide, boron carbide, molybdenum carbide, niobium carbide, vanadium carbide and zirconium carbide, said silicon carbide being present in an amount of at least 4% by weight of said article and said selected carbide being present in an amount of at least 5% by weight of said article, at least said selected carbide of said group having been provided in said article prior to graphitization.

2. A method as defined by claim 1 in which said selected carbide of said group is introduced into said mix prior to forming the same to such desired shape.

3. A method as defined by claim 1 in which said selected carbide of said group is produced in situ in said article prior to graphitization of the same.

4. A method as defined by claim 1 in which silicon carbide is introduced into said mix prior to forming the same to such desired shape.

5. A method as defined by claim 1 in which said silicon carbide is formed during graphitization.

6. A method as defined by claim 1 in which said selected carbide is titanium carbide.

7. A method for producing a formed, artificial graphite article, which method comprises preparing a mix of comminuted carbon and carbonizable binder material; forming an article of desired shape from said mix; baking the article so formed to carbonize said binder material; graphitizing the formed, baked article by heating the same to graphitizing temperature while said article contains, during graphitization, silicon carbide and at least one carbide selected from the group consisting of titanium carbide, boron carbide, molybdenum carbide, niobium carbide, vanadium carbide and zirconium carbide, said silicon carbide being present in an amount of at least 4% by weight of said article and said selected carbide being present in an amount of at least 5% by weight of said article; and removing residual carbide from the graphitized article so produced.

8. A method as defined by claim 7 in which said residual carbide is removed from said graphitized article by heating the same in the presence of gaseous halogen.

9. A method for producing a formed, artificial graphite article, which method comprises preparing a mix of comminuted carbon and carbonizable binder material; forming an article of desired shape from said mix; baking the article so formed to carbonize said binder material; graphitizing the formed, baked article by heating the same to graphitizing temperature while said article contains, during graphitization, silicon carbide and at least one carbide selected from the group consisting of titanium carbide, boron carbide, molybdenum carbide, niobium carbide, vanadium carbide and zirconium carbide, the aggregate of silicon carbide and said selected carbide present during graphitization being not more than about 20% by weight of said article and said selected carbide being present in an amount of at least 5% by weight of said article and said silicon carbide being present in an amount of at least 4% by weight of said article; and removing residual carbide from the graphitized article so produced.

10. A method as defined in claim 9 in which said selected carbide is titanium carbide.

11. A method as defined in claim 9 in which said selected carbide is boron carbide.

12. A method for producing a formed, artificial graphite article, which method comprises preparing a mix of comminuted carbon, carbonizable binder material, and titanium carbide, said carbide being present in said mix in a proportion of at least 5% by weight thereof; forming an article of desired shape from said mix; baking the article so formed to carbonize said binder material; graphitizing the formed, baked article by heating the same to graphitizing temperature while said article contains at least 4% by weight silicon carbide, the aggregate of silicon carbide and titanium carbide not exceeding about 20% by weight of said article; and removing residual carbide from said article after graphitization.

13. A method as defined by claim 12 in which silicon carbide is incorporated in said mix in a proportion at least about 0.8 of the quantity of titanium carbide present therein.

14. A method as defined by claim 12 in which said article is packed during graphitization in a mixture of coke and sand wherein silicon carbide is produced during heating of said article to graphitizing temperature.

15. In the manufacture of articles of graphitized carbon by the method in which an article is formed of a mix of comminuted carbon and carbonizable binder and the formed article is baked to carbonize the binder and then heated to graphitizing temperature, the improvement which comprises conducting said graphitizing step while said article contains at least 4% by weight silicon carbide and at least 5% by weight of one carbide selected from the group consisting of titanium carbide, boron carbide, molybdenum carbide, niobium carbide, vanadium carbide, and zirconium carbide.

16. In the improved method defined by claim 15, the further improvement in which said silicon carbide and said selected carbide are added to the mix from which said article is formed.

References Cited in the file of this patent
UNITED STATES PATENTS

| | | |
|---|---|---|
| 617,979 | Acheson | Jan. 17, 1899 |
| 711,031 | Acheson | Oct. 14, 1902 |
| 836,355 | Acheson | Nov. 20, 1906 |
| 2,315,346 | Mitchell | Mar. 30, 1943 |

OTHER REFERENCES

Currie et al.: "Peaceful Uses of Atomic Energy," vol. 8, pages 451–454, 471, United Nations, N.Y., 1956.